United States Patent
Cunningham et al.

(10) Patent No.: US 11,440,597 B2
(45) Date of Patent: Sep. 13, 2022

(54) SELECTIVELY DEPLOYABLE AERODYNAMIC SURFACES ON A REAR WING OF A VEHICLE

(71) Applicant: GM GLOBAL TECHNOLOGY OPERATIONS LLC, Detroit, MI (US)

(72) Inventors: Andrew T. Cunningham, Royal Oak, MI (US); Adam Golembeski, Royal Oak, MI (US); Alexander N. Nastov, Farmington Hills, MI (US); David C. Caples, Huntington Woods, MI (US); Joel P. Ruschman, Beverly Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 179 days.

(21) Appl. No.: 16/984,470

(22) Filed: Aug. 4, 2020

(65) Prior Publication Data
US 2022/0041228 A1    Feb. 10, 2022

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
See application file for complete search history.

(56) References Cited

U.S. PATENT DOCUMENTS

| | | | |
|---|---|---|---|
| 9,776,675 B1* | 10/2017 | Berger | B62D 35/007 |
| 2017/0297636 A1* | 10/2017 | Shinedling | B62D 35/007 |
| 2019/0054962 A1* | 2/2019 | Potvin | B62D 35/007 |
| 2019/0176909 A1* | 6/2019 | Slight | B62D 35/02 |
| 2019/0256157 A1* | 8/2019 | Hinterbuchinger | B62D 37/02 |
| 2020/0377158 A1* | 12/2020 | Cunningham | B62D 35/007 |

FOREIGN PATENT DOCUMENTS

| | | | | |
|---|---|---|---|---|
| DE | 102008006007 A1 * | 7/2009 | | B62D 35/007 |
| DE | 202018103960 U1 * | 8/2018 | | B62D 25/12 |
| DE | 102019005838 A1 * | 2/2020 | | |
| EP | 1659050 A2 * | 5/2006 | | B62D 35/007 |

* cited by examiner

*Primary Examiner* — Lori L Lyjak
(74) *Attorney, Agent, or Firm* — Cantor Colburn LLP

(57) ABSTRACT

A rear wing for a motor vehicle includes a first end, a second end, and an aerodynamic surface including a pressure side extending between the first end and the second end, a first end plate is arranged at the first end, and a second end plate is arranged at the second end. At least one of the first end plate and the second end plate includes a selectively deployable aerodynamic surface.

20 Claims, 9 Drawing Sheets

SELECTIVELY DEPLOYABLE AERODYNAMIC SURFACES ON A REAR WING OF A VEHICLE

INTRODUCTION

The subject disclosure relates to the art of vehicles and, more particularly, to selectively deployable aerodynamic surfaces provided on a rear wing of a vehicle.

Various performance vehicles may include one or more aerodynamic surfaces that improve vehicle performance. For example, the vehicle may be provided with a front wing, an air dam, ground effect skirts, and/or a rear wing or spoiler. Typically, the aerodynamic surfaces are designed to reduce drag and increase negative lift, or downforce, that may improve traction. In some cases, the rear wing may include end plates that serve to channel or funnel air over the aerodynamic surfaces and/or modify the vortices induced by the pressure differential at the wing ends. The end plates themselves may generate air vortices that can affect the drag or downforce on the vehicle.

Some manufactures have added gills or slots in the end plates that reduce or channel the vortices to reduce any associated drag effect. Stationary flaps may also be used to alter the vortices to increase downforce and/or reduce drag. The location, size, shape, and orientation of the gills and/or flaps are optimized for selected conditions including specific vehicle operating conditions, vehicle trajectories, and/or vehicle speed ranges as well as for other design imperatives such as desired vehicle aesthetics. As such, the end plates may create undesirable drag or downforce when exposed to conditions other than the selected conditions. Accordingly, it is desirable to provide an end plate that can accommodate a wide range of operating conditions without the need to be optimized for specific conditions or appearances.

SUMMARY

In one exemplary embodiment, a rear wing for a motor vehicle includes a first end, a second end, and an aerodynamic surface including a pressure side extending between the first end and the second end, a first end plate is arranged at the first end, and a second end plate is arranged at the second end. At least one of the first end plate and the second end plate includes a selectively deployable aerodynamic surface.

In addition to one or more of the features described herein the first end plate includes a first portion that extends upwardly relative to the pressure side and a second portion that extends downwardly relative to the pressure side, the first portion including an upper edge and the second portion including a lower edge, the selectively deployable aerodynamic surface being provided on one of the first portion and the second portion.

In addition to one or more of the features described herein the selectively deployable aerodynamic surface is provided on the first portion and extends substantially parallel to the upper edge.

In addition to one or more of the features described herein the selectively deployable aerodynamic surface is provided on the first portion and extends substantially perpendicularly to the upper edge.

In addition to one or more of the features described herein the selectively deployable aerodynamic surface includes a first selectively deployable aerodynamic surface arranged on the first portion and a second selectively deployable aerodynamic surface arranged on the second portion.

In addition to one or more of the features described herein the first selectively deployable aerodynamic surface includes a first orientation relative to the upper edge and the second selectively deployable aerodynamic surface includes a second orientation relative to the upper edge.

In addition to one or more of the features described herein the first orientation is distinct from the second orientation.

In addition to one or more of the features described herein the first selectively deployable aerodynamic surface includes a first geometry and the second selectively deployable aerodynamic surface includes a second geometry.

In addition to one or more of the features described herein the second geometry is distinct from the first geometry.

In addition to one or more of the features described herein the selectively deployable aerodynamic surface shifts between a non-deployed and a deployed configuration.

In addition to one or more of the features described herein the selectively deployable aerodynamic surface comprises the upper edge, the upper edge being selectively shiftable relative to the first portion.

In addition to one or more of the features described herein the selectively deployable aerodynamic surface includes a first selectively deployable aerodynamic surface comprising the upper edge and a second selectively deployable aerodynamic surface comprising the lower edge, each of the first selectively deployable aerodynamic surface and the second selectively deployable aerodynamic surface being selectively shiftable relative to the first portion.

In addition to one or more of the features described herein a vehicle body, the rear wing being mounted to a rear portion of the vehicle body.

In addition to one or more of the features described herein a controller coupled to the selectively deployable aerodynamic surface, the controller being operable to deploy the selectively deployable aerodynamic surface based on at least one of forces perceived by the motor vehicle and operating parameters of the vehicle.

In another exemplary embodiment, a method of controlling airflow over a rear wing of a motor vehicle includes guiding air over a pressure side of the rear wing, channeling the air across the pressure side through a flow modification region defined between a first end plate and a second end plate disposed on opposing ends of the rear wing, and selectively deploying an aerodynamic surface of one of the first end plate and the second end plate to modify the air passing through the flow modification region.

In addition to one or more of the features described herein selectively deploying the aerodynamic surface includes rotating a first side aerodynamic surface positioned upward of the pressure side on the first end plate and guiding a portion of the air out from the flow modification region.

In addition to one or more of the features described herein selectively deploying the aerodynamic surface includes rotating a first side aerodynamic surface positioned below the pressure side on the first end plate and drawing in more air to the flow modification region.

In addition to one or more of the features described herein selectively deploying the aerodynamic surface includes shifting a first side aerodynamic surface positioned on the first end plate and shifting a second side aerodynamic surface positioned on the second end plate.

In addition to one or more of the features described herein selectively deploying the aerodynamic surface includes folding at least one of an upper edge of the first end plate and a lower edge of the first end plate.

In addition to one or more of the features described herein, the method also includes detecting at least one of forces perceived by the motor vehicle and an operating parameter of the vehicle, and selectively deploying the aerodynamic surface based on the one of the forces perceived by the motor vehicle and the operating parameter of the motor vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
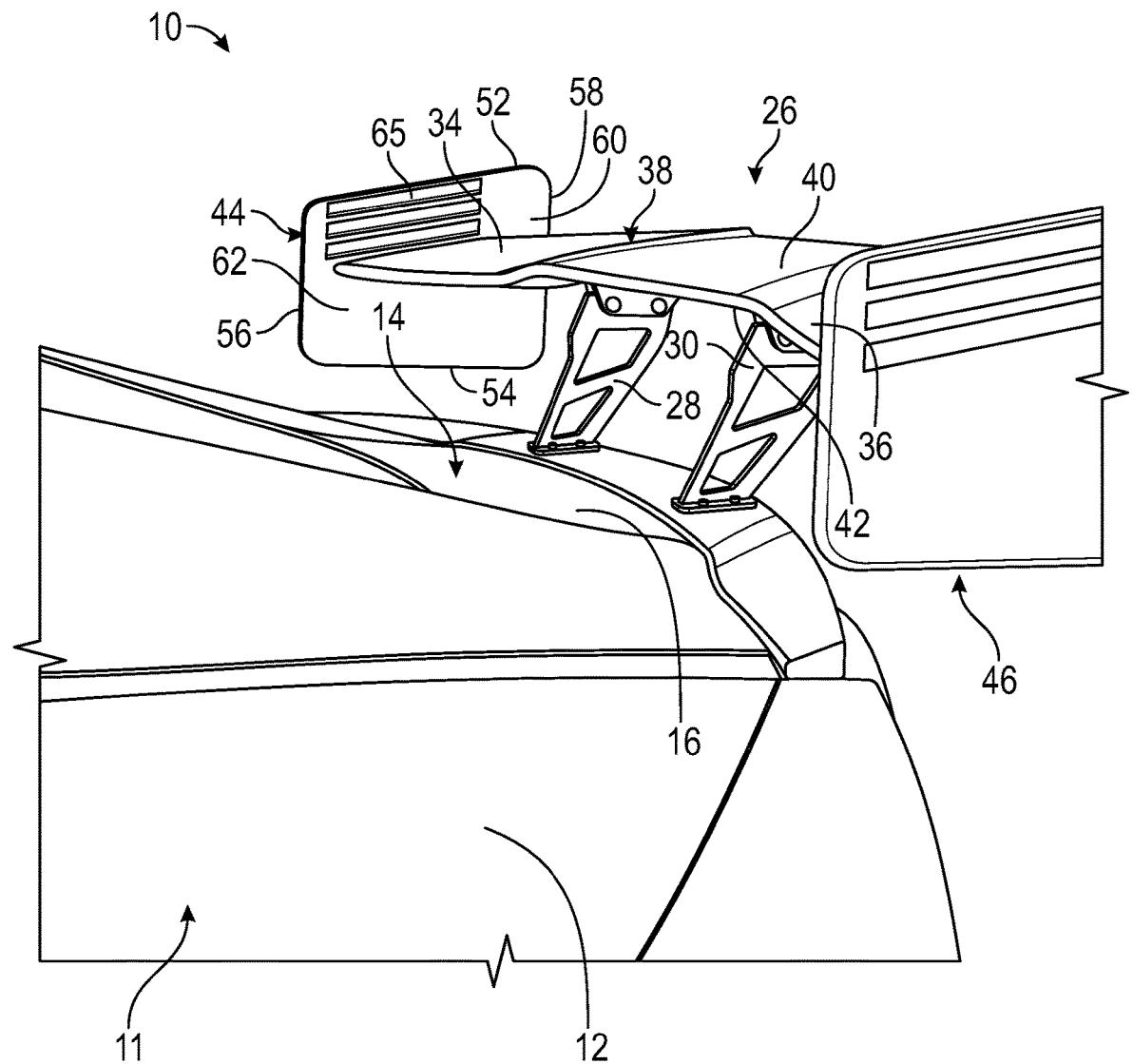
FIG. 1 depicts an aerodynamic rear wing including first and second end plates having selectively deployable aerodynamic surfaces shown in a non-deployed configuration mounted to a rear portion of a vehicle, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is generally shown at 10 in FIG. 1. Vehicle 10 includes a body 11 including a rear portion 12 having an access panel 14 that may take the form of a trunk lid 16. An aerodynamic rear wing 26 is connected to trunk lid 16 through a first support 28 and a second support 30. At this point, it should be understood that access panel 14 may take on various forms including a panel that provides access to an engine compartment or other vehicle system. Also, while shown as being mounted to an access panel, it should be understood that aerodynamic rear wing 26 may be mounted directly to body 11 through first and second supports 28 and 30.

In an embodiment, aerodynamic rear wing 26 includes a first end 34 and a second end 36. An aerodynamic surface 38 extends between first end 34 and second end 36. Aerodynamic surface 38 includes a pressure side 40 and a suction side 42. A first end plate 44 is provided at first end 34 and a second end plate 46 is provided at second end 36. First and second end plates 44 and 46 channel air across pressure side 40 and suction side 42. As each end plate is substantially similarly formed, a detailed description will follow with reference to first end plate 44 with an understanding that second end plate 46 includes similar structure. At this point, it should be understood that while shown as having a suction side, rear wing 26 may only include a pressure side. That is, rear wing 26 may be mounted directly to body 11 without the use of supports.

Figure 2:
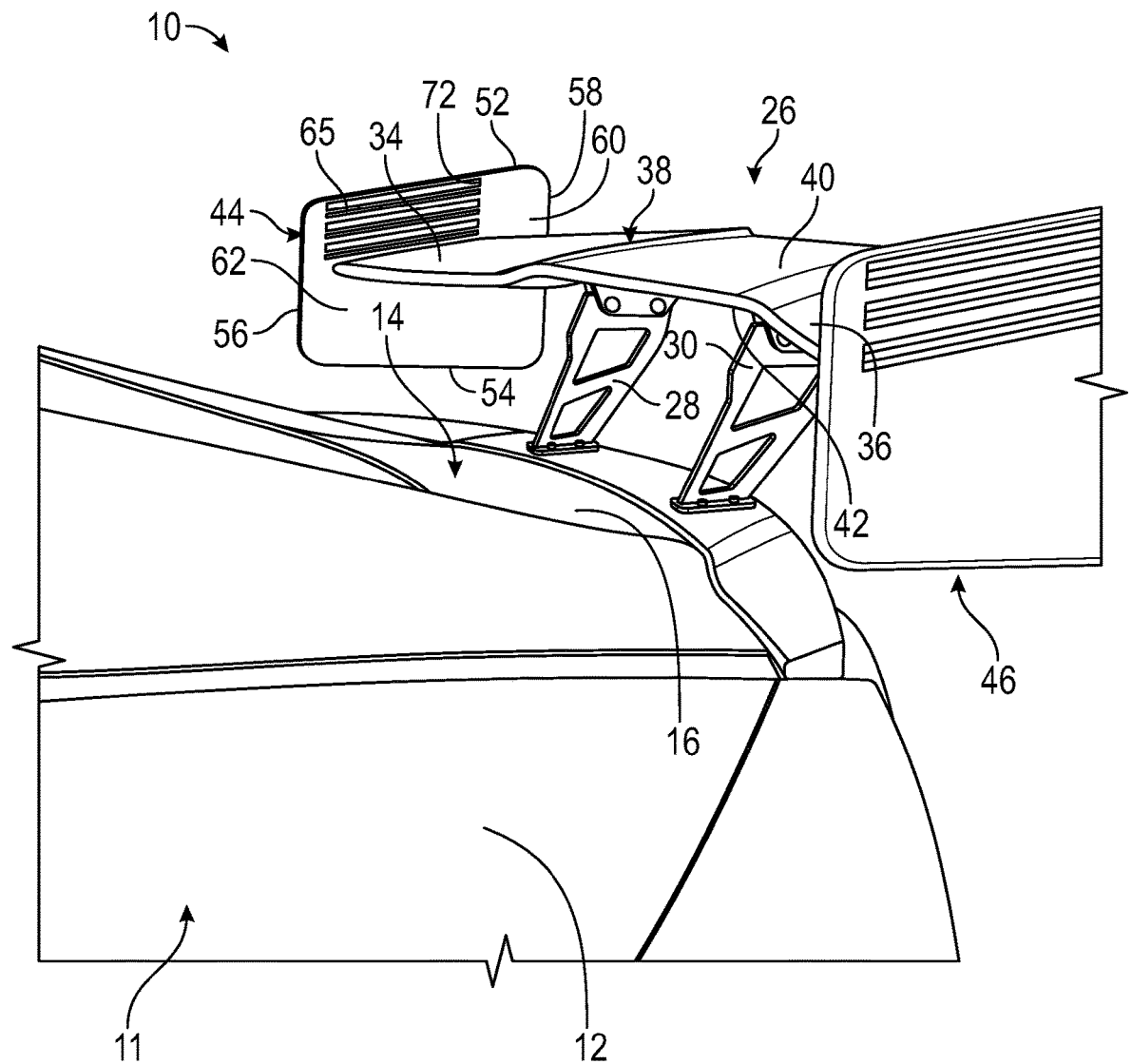
FIG. 2 depicts the rear wing of FIG. 1 with the selectively deployable aerodynamic surfaces in a deployed configuration.

In the embodiment shown, first end plate 44 includes an upper edge 52, a lower edge 54, a forward edge 56, and a rear edge 58. First end plate 44 also includes a first portion 60 defined between pressure side 40 and upper edge 52 and a second portion 62 defined between suction side 42 and lower edge 54. In accordance with an exemplary aspect, first portion 60 includes a plurality of selectively deployable aerodynamic surfaces 65 that extend substantially parallel to upper edge 52. Selectively deployable aerodynamic surfaces 65 pivot or rotate between a first or non-deployed configuration, such as shown in FIG. 1 and a second or deployed configuration, such as shown in FIG. 2 exposing a plurality of openings 72.

In the first configuration, air passing over aerodynamic surface 38 remains between first and second end plates 44 and 46. In the second configuration, a portion of the air passing over pressure side 40 may exit through openings 72 to selectively adjust a downforce on rear portion 12 of vehicle 10. That is, as will be detailed herein, selectively deployable aerodynamic surfaces 65 may be shifted based on vehicle parameters, including one or more of throttle position, yaw angle, vehicle speed, drag, wind direction, brake pressure, as well as other vehicle conditions to selectively tune drag, downforce, yaw stability and other factors in real time.

Figure 3A:
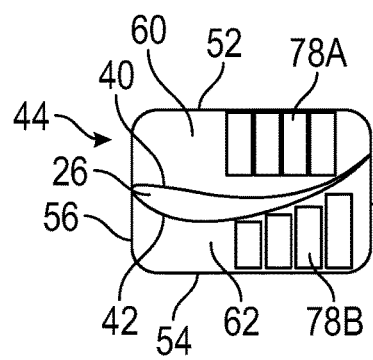
FIG. 3A depicts an aerodynamic rear wing end plate including selectively deployable aerodynamic surfaces, in accordance with an aspect of an exemplary embodiment.

At this point, it should be understood that while shown as having a generally rectangular shape, selectively deployable aerodynamic surfaces 65 may take on a variety of forms and orientations. Further, it should be understood that selectively deployable aerodynamic surfaces 65 may be provided on second portion 62 or be arranged on both first and second portions 60 and 62. For example, as shown in FIG. 3A, a first plurality of selectively deployable aerodynamic surfaces 78A may be arranged on first portion 60 and a second plurality of selectively deployable aerodynamic surfaces 78B may be arranged on second portion 62. First and second pluralities of selectively deployable aerodynamic surfaces 78A and 78B may extend substantially perpendicularly relative to upper edge 52.

Figure 3B:
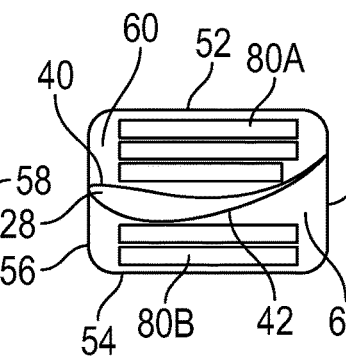
FIG. 3B depicts an aerodynamic rear wing end plate including selectively deployable aerodynamic surfaces, in accordance with another aspect of an exemplary embodiment.
Figure 3C:
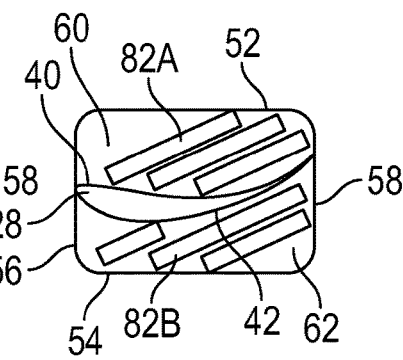
FIG. 3C depicts an aerodynamic rear wing end plate including selectively deployable aerodynamic surfaces, in accordance with yet another aspect of an exemplary embodiment.

As shown in FIG. 3B, a first plurality of selectively deployable aerodynamic surfaces 80A may be arranged on first portion 60 and a second plurality of selectively deployable aerodynamic surfaces 80B may be arranged on second portion 62. First and second pluralities of selectively deployable aerodynamic surfaces 80A and 80B may extend substantially parallel relative to upper edge 52. In FIG. 3C, a first plurality of selectively deployable aerodynamic surfaces 82A may be arranged on first portion 60 and a second plurality of selectively deployable aerodynamic surfaces 82B may be arranged on second portion 62. First and second pluralities of selectively deployable aerodynamic surfaces 82A and 82B may extend at an angle relative to upper edge 52.

Figure 3D:
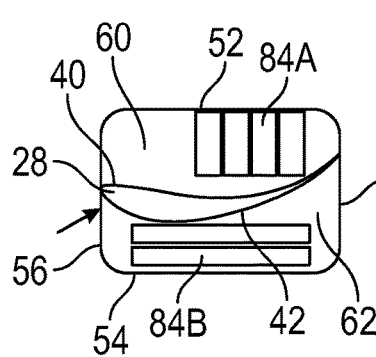
FIG. 3D depicts an aerodynamic rear wing end plate including selectively deployable aerodynamic surfaces, in accordance with still yet another aspect of an exemplary embodiment.

In FIG. 3D, a first plurality of selectively deployable aerodynamic surfaces 84A may be arranged on first portion 60 and a second plurality of selectively deployable aerodynamic surfaces 84B may be arranged on second portion 62. First plurality of selectively deployable aerodynamic surfaces 84A may extend substantially perpendicularly relative to upper edge 52 and second plurality of selectively deployable aerodynamic surfaces 84B may extend substantially parallel relative to upper edge 52.

Figure 3E:
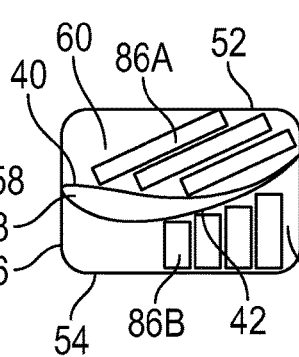
FIG. 3E depicts an aerodynamic rear wing end plate including selectively deployable aerodynamic surfaces, in accordance with yet still another aspect of an exemplary embodiment.

In FIG. 3E, a first plurality of selectively deployable aerodynamic surfaces 86A may be arranged on first portion 60 and a second plurality of selectively deployable aerodynamic surfaces 86B may be arranged on second portion 62. First plurality of selectively deployable aerodynamic surfaces 86A may extend at an angle relative to upper edge 52 and second plurality of selectively deployable aerodynamic surfaces 86B may extend substantially perpendicularly relative to upper edge 52.

Figure 3F:
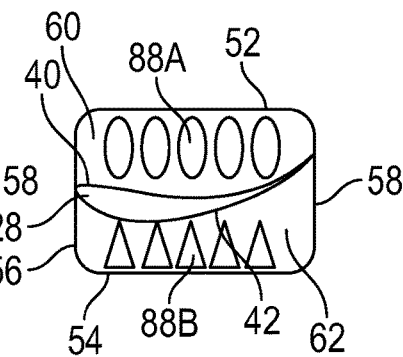
FIG. 3F depicts an aerodynamic rear wing end plate including selectively deployable aerodynamic surfaces, in accordance with a further aspect of an exemplary embodiment.

In FIG. 3F, a first plurality of selectively deployable aerodynamic surfaces 88A may be arranged on first portion 60 and a second plurality of selectively deployable aerodynamic surfaces 88B may be arranged on second portion 62. First plurality of selectively deployable aerodynamic surfaces 88A may have a first shape and second plurality of selectively deployable aerodynamic surfaces 88B may have a second shape that is different from the first shape.

Figure 4:
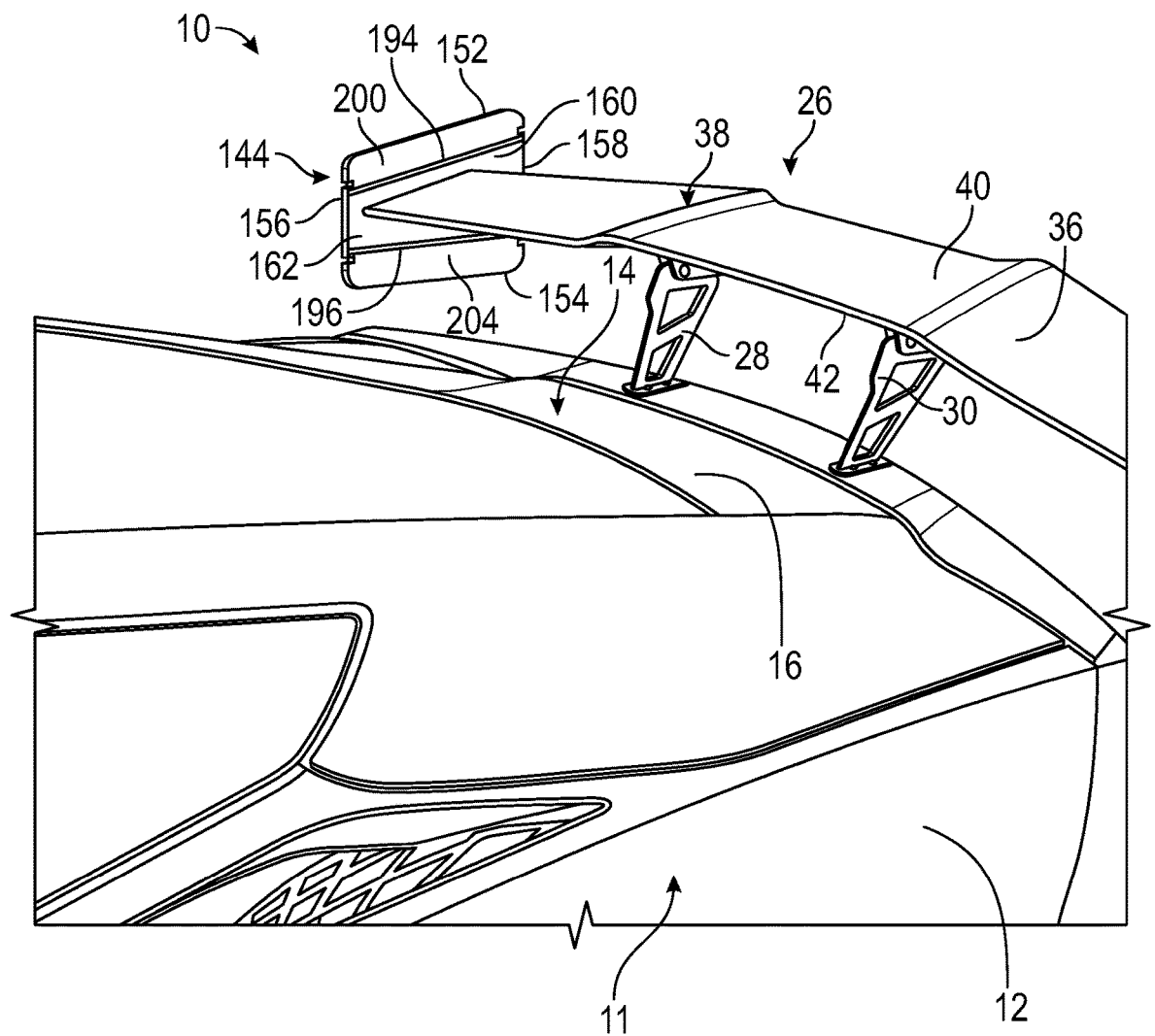
FIG. 4 depicts an aerodynamic rear wing including first and second end plates having selectively deployable aerodynamic surfaces shown in a non-deployed configuration, in accordance with another aspect of an exemplary embodiment.

Reference will now follow to FIG. 4 in describing a first end plate 144 in accordance with another aspect of an exemplary embodiment. First end plate 144 includes an upper edge 152, a lower edge 154, a forward edge 156, and a rear edge 158. First end plate 144 also includes a first portion 160 defined between pressure side 40 and upper edge 152 and a second portion 162 defined between suction side 42 and lower edge 154. In accordance with an exemplary aspect, first end plate 144 includes a first hinge 194 that extends between forward edge 156 and rear edge 158 spaced from upper edge 152 and a second hinge 196 extending between forward edge 156 and rear edge 158 spaced from lower edge 154.

Figure 5:
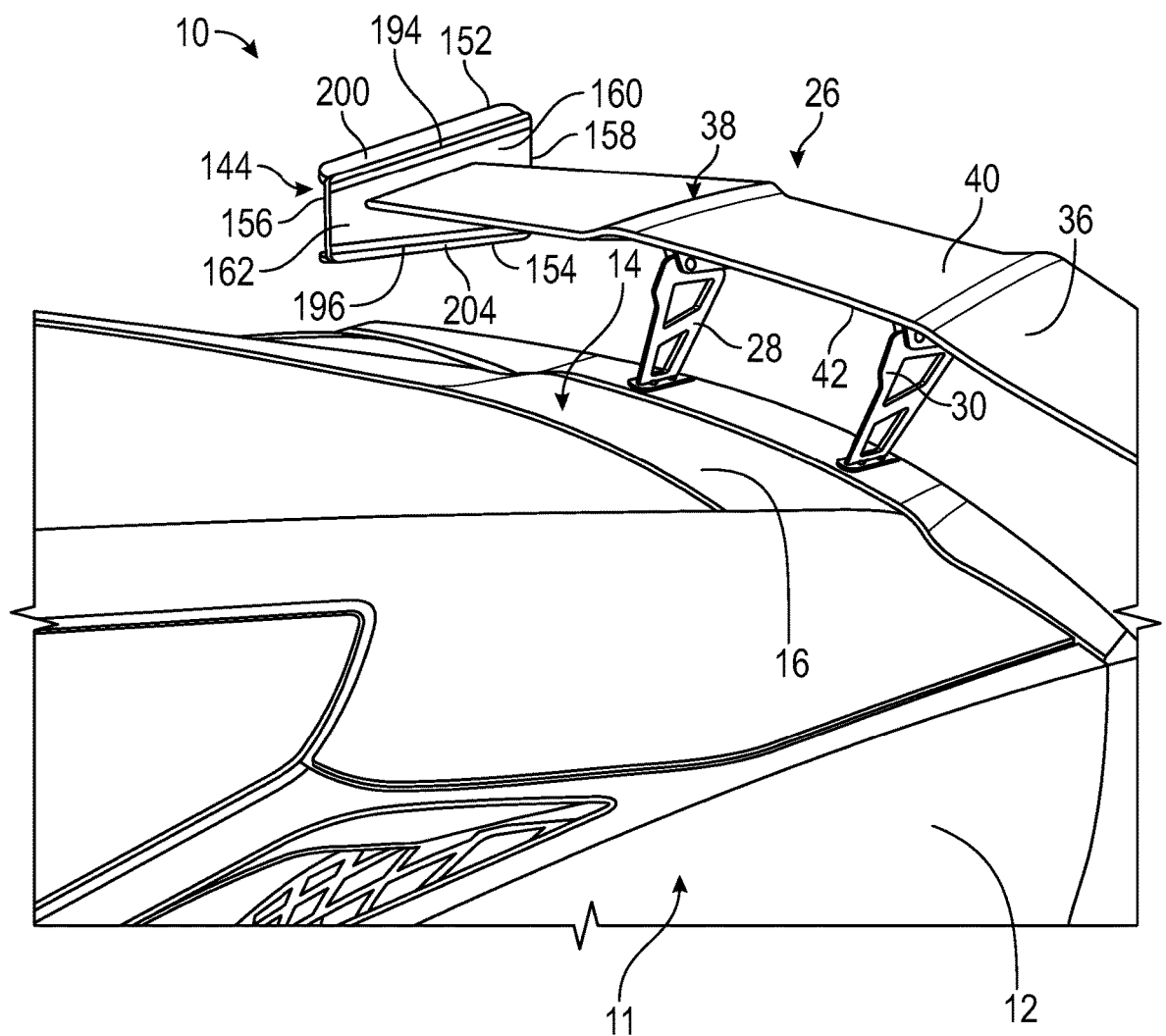
FIG. 5 depicts the aerodynamic rear wing of FIG. 4 illustrating the selectively deployable aerodynamic surfaces in a deployed configuration.

First hinge 194 forms a first selectively deployable aerodynamic surface 200 and second hinge 196 forms a second selectively deployable aerodynamic surface 204. First and second selectively deployable aerodynamic surfaces 200 and 204 may transition between a first or non-deployed configuration as shown in FIG. 4 and a second or deployed configuration such as shown in FIG. 5. In the second configuration, first and second selectively deployable aerodynamic surfaces 200 and 204 pivot outwardly of first end plate 144. The amount of outward pivoting is based on vehicle conditions as will be detailed herein.

Figure 6:
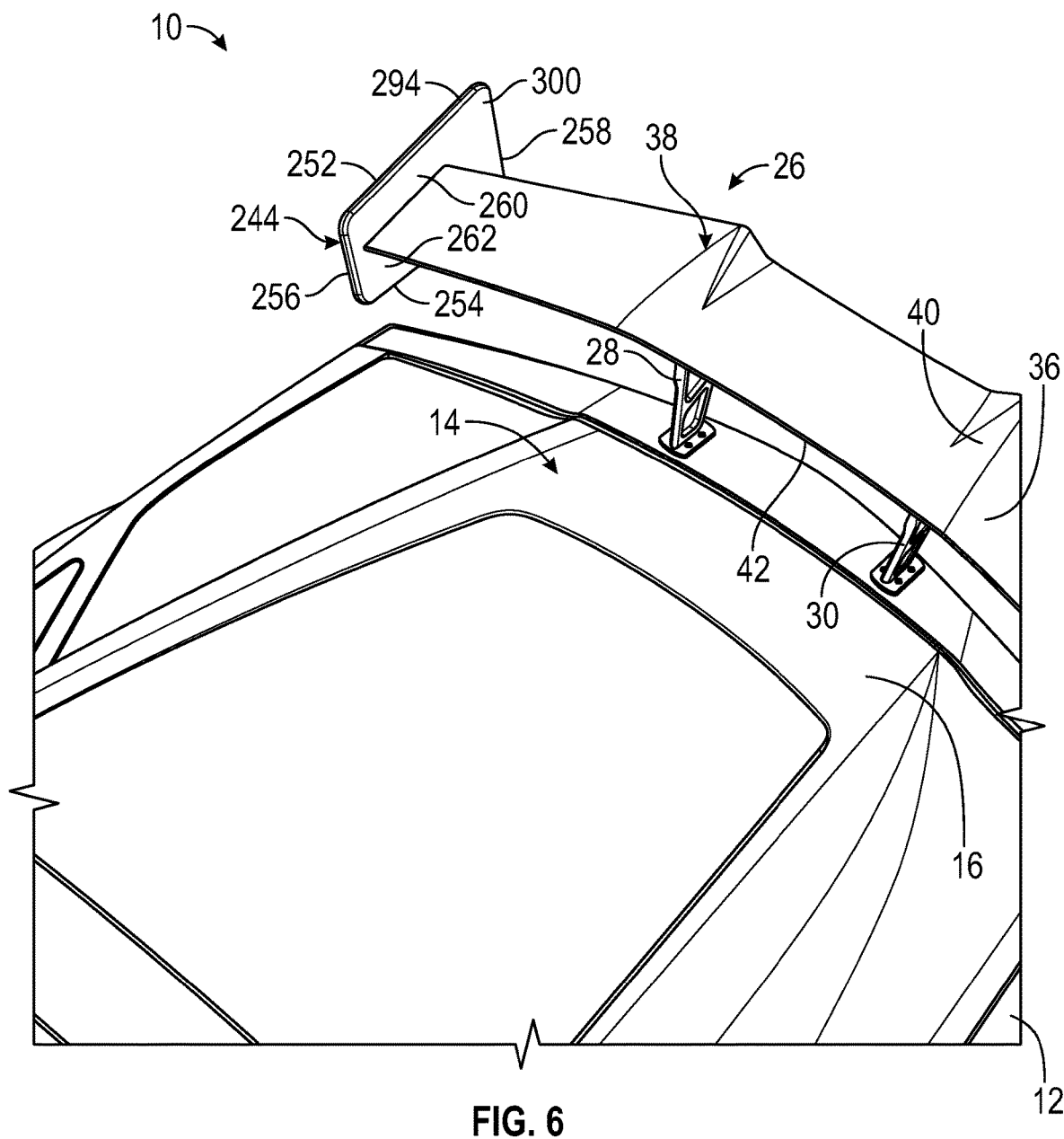
FIG. 6 depicts an aerodynamic rear wing including first and second end plates having selectively deployable aerodynamic surfaces shown in a non-deployed configuration mounted to a rear portion of a vehicle, in accordance with still yet another aspect of an exemplary embodiment.
Figure 7:
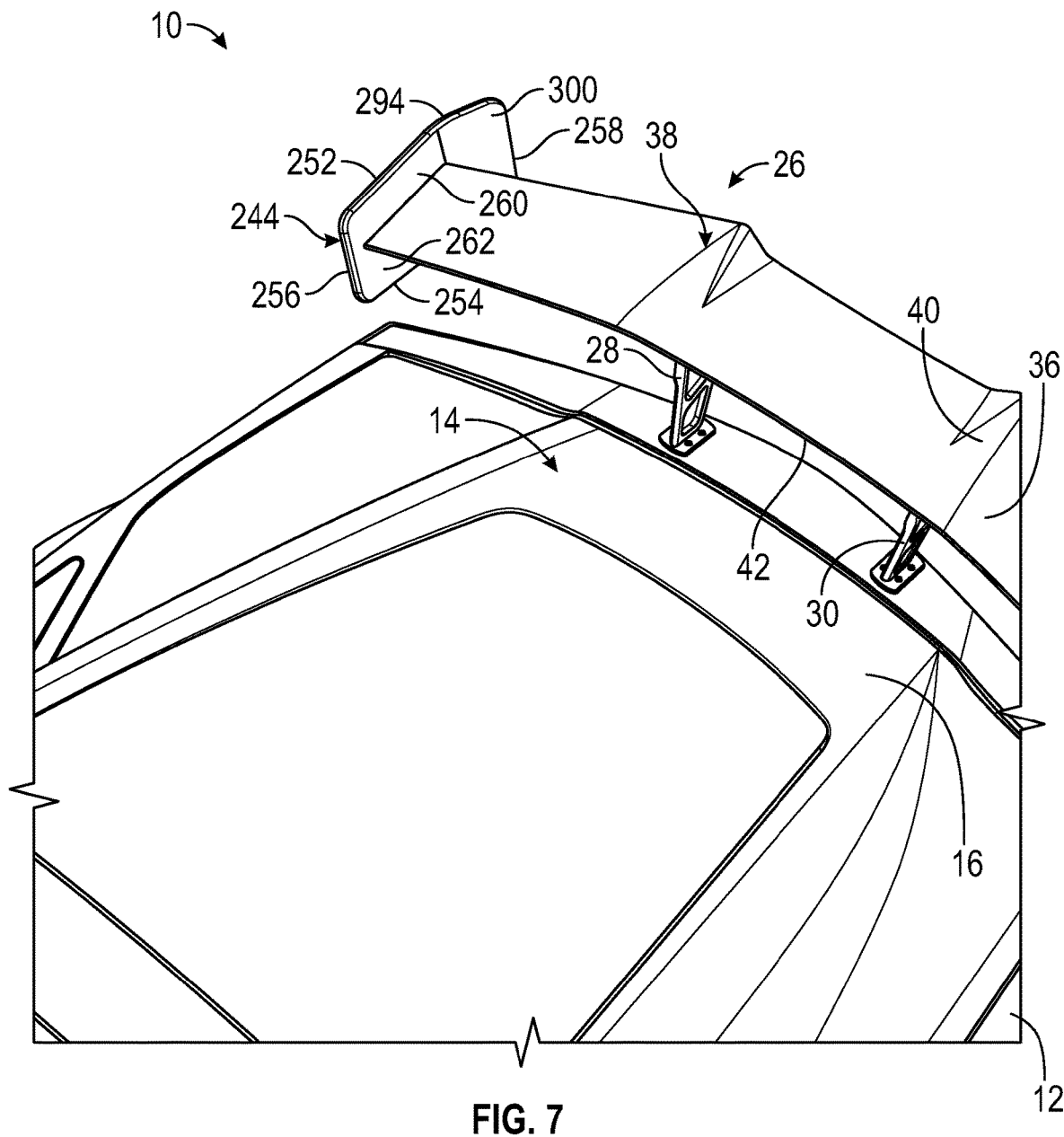
FIG. 7 depicts the aerodynamic rear wing of FIG. 6 illustrating the selectively deployable aerodynamic surfaces in a first deployed configuration.

FIGS. 6-7 depict a first end plate 244 constructed in accordance with another aspect of an exemplary embodiment. First end plate 244 an upper edge 252, a lower edge 254, a forward edge 256, and a rear edge 258. First end plate 244 also includes a first portion 260 defined between pressure side 40 and upper edge 252 and a second portion 262 defined between suction side 42 and lower edge 254. In accordance with an exemplary aspect, first end plate 244 includes a first hinge 294 that extends between upper edge 252 and lower edge 254 spaced from rear edge 258.

Figure 8:
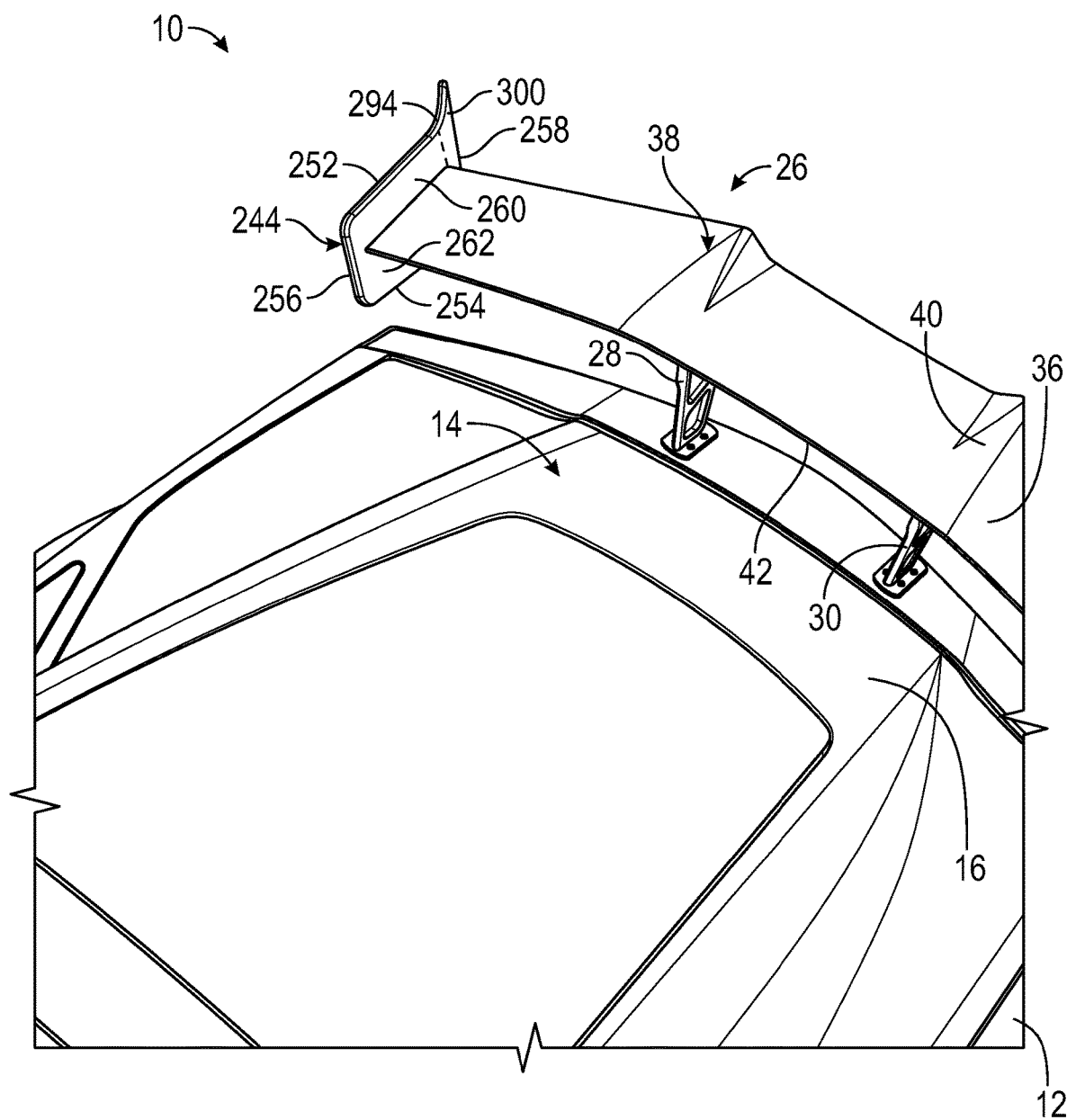
FIG. 8 depicts the aerodynamic rear wing of FIG. 6 illustrating the selectively deployable aerodynamic surfaces in a second deployed configuration.

First hinge 294 forms a selectively deployable aerodynamic surface 300. Selectively deployable aerodynamic surface 300 transitions between a first or non-deployed configuration as shown in FIG. 6, a first deployed configuration as shown in FIG. 7, and a second deployed configuration, as shown in FIG. 8. In the first deployed configuration, selectively deployable aerodynamic surface 300 rotates inwardly. In the second deployed configuration, selectively deployable aerodynamic surface 300 rotates outwardly. The amount of outward or inward rotation may be based on vehicle conditions as will be detailed herein.

Figure 9:
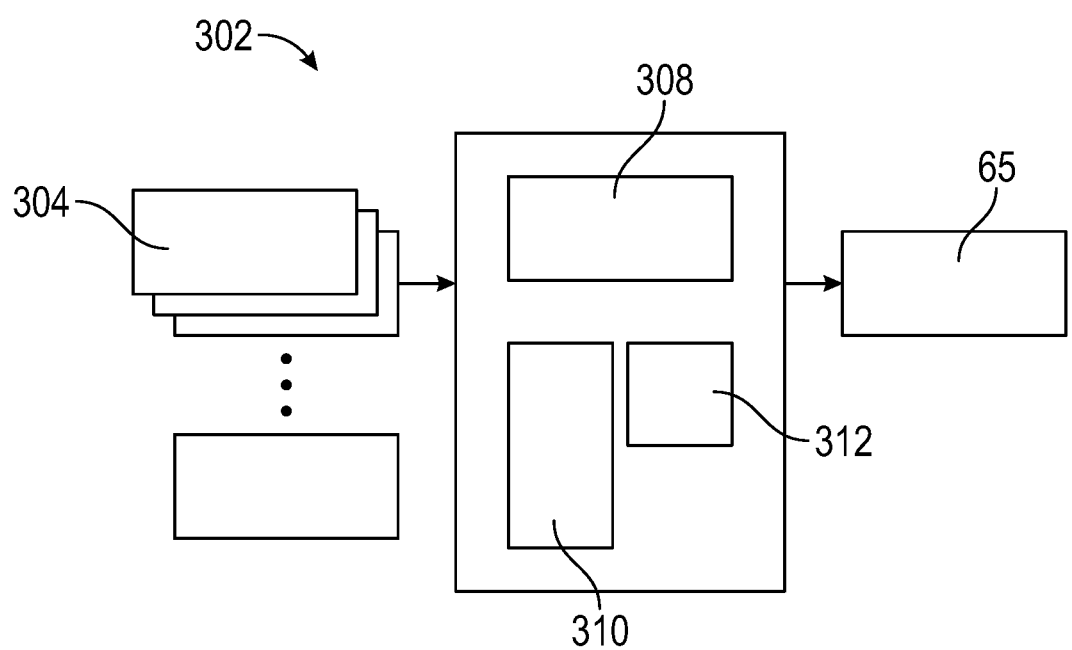
FIG. 9 depicts a block diagram illustrating a control system for the selectively deployable aerodynamic surfaces, in accordance with an exemplary embodiment.

Reference will now follow to FIG. 9 in describing a controller 302 connected to the plurality of selectively deployable aerodynamic surfaces. Of course, it should be understood that controller 302 may be used to operate any of the selectively deployable aerodynamic surfaces disclosed herein. Controller 302 is also connected to a plurality of sensors 304 that detect various parameters of vehicle 10. Controller 302 may include a CPU 308, a non-volatile memory 310 and a selectively deployable aerodynamic surface control module 312. Sensors 304 may detect one or more of throttle position, yaw angle, vehicle speed, drag, wind direction, brake pressure, and/or tire pressure and provide the sensed information to controller 302. Selectively deployable aerodynamic surface control module 312 determines how best to position the plurality of selectively deployable aerodynamic surfaces so as to tune or adjust, in real time, vehicle drag, downforce, yaw stability and other factors to improve performance.

In addition to deploying selectively deployable aerodynamic surfaces based on vehicle operating parameters and/or forces perceived by the vehicle, controller 302 may also move the selectively deployable aerodynamic surfaces to a stowed configuration according to user and/or manufacturer preferences. For example, controller 302 may stow the selectively deployable aerodynamic surfaces when parking the vehicle, passing the vehicle through a car wash, when in a car show mode or other times when the selectively deployable aerodynamic surfaces are not needed or would not provide an aerodynamic benefit.

The terms "about" and "substantially" are intended to include the degree of error associated with measurement of the particular quantity based upon the equipment available at the time of filing the application. For example, "about" and/or "substantially" can include a range of a given value.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A rear wing for a motor vehicle comprising:
   a first end, a second end, and an aerodynamic surface including a pressure side extending between the first end and the second end;
   a first end plate arranged at the first end; and
   a second end plate arranged at the second end, wherein at least one of the first end plate and the second end plate includes a selectively deployable aerodynamic surface.

2. The rear wing according to claim 1, wherein the first end plate includes a first portion that extends upwardly relative to the pressure side and a second portion that extends downwardly relative to the pressure side, the first portion including an upper edge and the second portion including a lower edge, the selectively deployable aerodynamic surface being provided on one of the first portion and the second portion.

3. The rear wing according to claim 2, wherein the selectively deployable aerodynamic surface is provided on the first portion and extends substantially parallel to the upper edge.

4. The rear wing according to claim 2, wherein the selectively deployable aerodynamic surface is provided on the first portion and extends substantially perpendicularly to the upper edge.

5. The rear wing according to claim 2, wherein the selectively deployable aerodynamic surface includes a first selectively deployable aerodynamic surface arranged on the first portion and a second selectively deployable aerodynamic surface arranged on the second portion.

6. The rear wing according to claim 5, wherein the first selectively deployable aerodynamic surface includes a first orientation relative to the upper edge and the second selectively deployable aerodynamic surface includes a second orientation relative to the upper edge.

7. The rear wing according to claim 6, wherein the first orientation is distinct from the second orientation.

8. The rear wing according to claim 5, wherein the first selectively deployable aerodynamic surface includes a first geometry and the second selectively deployable aerodynamic surface includes a second geometry.

9. The rear wing according to claim 8, wherein the second geometry is distinct from the first geometry.

10. The rear wing according to claim 2, wherein the selectively deployable aerodynamic surface shifts between a non-deployed and a deployed configuration.

11. The rear wing according to claim 2, wherein the selectively deployable aerodynamic surface comprises the upper edge, the upper edge being selectively shiftable relative to the first portion.

12. The rear wing according to claim 2, wherein the selectively deployable aerodynamic surface includes a first selectively deployable aerodynamic surface comprising the upper edge and a second selectively deployable aerodynamic surface comprising the lower edge, each of the first selectively deployable aerodynamic surface and the second selectively deployable aerodynamic surface being selectively shiftable relative to the first portion.

13. The rear wing according to claim 1, further comprising: a vehicle body, the rear wing being mounted to a rear portion of the vehicle body.

14. The rear wing according to claim 1, further comprising: a controller coupled to the selectively deployable aerodynamic surface, the controller being operable to deploy the selectively deployable aerodynamic surface based on at least one of forces perceived by the motor vehicle and operating parameters of the vehicle.

15. A method of controlling airflow over a rear wing of a motor vehicle comprising:
    guiding air over a pressure side of the rear wing;
    channeling the air across the pressure side through a flow modification region defined between a first end plate and a second end plate disposed on opposing ends of the rear wing; and
    selectively deploying an aerodynamic surface of one of the first end plate and the second end plate to modify the air passing through the flow modification region.

16. The method of claim 15, wherein selectively deploying the aerodynamic surface includes rotating a first side aerodynamic surface positioned upward of the pressure side on the first end plate and guiding a portion of the air out from the flow modification region.

17. The method of claim 15, wherein selectively deploying the aerodynamic surface includes rotating a first side aerodynamic surface positioned below the pressure side on the first end plate and drawing in more air to the flow modification region.

18. The method of claim 15, wherein selectively deploying the aerodynamic surface includes shifting a first side aerodynamic surface positioned on the first end plate and shifting a second side aerodynamic surface positioned on the second end plate.

19. The method of claim 15, wherein selectively deploying the aerodynamic surface includes folding at least one of an upper edge of the first end plate and a lower edge of the first end plate.

20. The method of claim 15, further comprising:
    detecting at least one of forces perceived by the motor vehicle and an operating parameter of the vehicle; and
    selectively deploying the aerodynamic surface based on the one of the forces perceived by the motor vehicle and the operating parameter of the motor vehicle.

* * * * *